United States Patent [19]

Bell

[11] 4,272,984
[45] Jun. 16, 1981

[54] PIPELINE LEAK DETECTION METHOD AND CONTROL DEVICE THEREFOR

[75] Inventor: David A. Bell, White City, Canada

[73] Assignee: Interprovincial Steel and Pipe Corporation, Ltd., Regina, Canada

[21] Appl. No.: 40,092

[22] Filed: May 18, 1979

[51] Int. Cl.³ ............................................. G01M 3/02
[52] U.S. Cl. ................................... 73/40.5 R; 138/97
[58] Field of Search .............. 73/40.5 R, 40.5 A, 49.1, 73/49.5; 138/90, 97, 93

[56] References Cited

U.S. PATENT DOCUMENTS

| | | | |
|---|---|---|---|
| 3,381,714 | 5/1968 | Johnson | 138/97 |
| 3,495,626 | 2/1970 | Nagel | 138/97 |

Primary Examiner—Gerald Goldberg
Assistant Examiner—Joseph W. Roskos
Attorney, Agent, or Firm—Klarquist, Sparkman, Campbell, Leigh, Hall & Whinston

[57] ABSTRACT

For sealing a pipeline at selective locations in order to perform leak tests, a pipeline packer assembly capable of internal travel within the pipeline can be moved to and stopped at selected locations and the packer inflated against the interior pipe walls to prevent further movement of the unit, and to provide a seal so that the pipeline may be subjected to internal high pressures to detect leaks. According to the invention, a control device for such unit comprises a gamma ray detector and signal processor receiving the electrical analogue signal from the gamma ray detector. An energizing signal from the signal processor actuates a stepping switch which provides "inflate" and "deflate" energization of the packer, and is kept in "off" condition while the packer is inoperative as in transit within the pipeline. A radiation source on the surface or selectively inserted into a bore hole near the pipeline provides a stimulus for the gamma ray detector which controls the operation of the stepping switch. The insertion and subsequent withdrawal of the radiation source from the vicinity of the pipe adjacent the control unit, successively causes the successive stepping of the stepping switch to "inflate", "deflate" and "off" conditions. The assembly is moved through the pipeline at low pressure, and the pipeline subjected to high pressure behind the packer when it is inflated, thereby to permit leak detection at successive locations within the pipeline.

6 Claims, 4 Drawing Figures

PIPELINE LEAK DETECTION METHOD AND CONTROL DEVICE THEREFOR

BACKGROUND OF THE INVENTION

The present invention relates to a method for detecting the location of leaks in a pipeline, and to a control device for selectively actuating a packer unit of a packer assembly capable of internal travel through the pipeline, and capable of selective sealing of the pipeline in response to the operation of the control device.

Packer assemblies of various degrees of complexity for introduction into oil and gas wells and for sealing off oil and gas wells at predetermined depths are known. Various devices for insertion into pipelines for the performance of various functions are also known. Notwithstanding this knowledge, heretofore the standard method of detecting the location of a leak in a pipeline has been to sever the pipeline at a selected point, block a portion of the pipeline thus severed, and introduce fluid under pressure into the pipeline to determine whether in the severed portion there is a leak.

When packer assemblies are used in oil and gas wells, their location within the well is readily determinable by measuring the number of feet of supporting cable played out. However, this approach to determination of location is impracticable in a pipeline because of the long distances involved, the danger of cable breakage, excessive friction by cable rubbing against pipe walls, etc.

SUMMARY OF THE INVENTION

According to the present invention, the location of leaks in a pipeline may be detected by introducing into the pipeline, an assembly including a pipe-sealing packer unit, a control unit therefor and a radioactive source shielded from the control unit. The control unit includes a gamma ray detector located internally within the assembly which, through appropriate signal processing circuitry, controls the sealing and unsealing of the pipe by the packer unit in response to the detection of gamma radiation exceeding a preset threshold. The detection of gamma radiation exceeding the threshold is hereinafter referred to as a "detection event". The assembly is advanced through the pipeline by means of fluid flow at relatively low fluid pressure. The progress of the assembly through the pipeline may be monitored externally by means of a gamma ray detector which responds to gamma radiation emitted from the radioactive source. At a selected location of the assembly within the pipeline, the assembly is halted (normally by reducing the pressure behind it to zero or close to zero), and the packer unit is then brought into sealing engagement with the interior pipeline wall by subjecting the internally located gamma ray detector to a gamma ray detection event. This is conveniently accomplished by introducing a radiation source into the vicinity of the control unit, which preferably operates in stepwise fashion in response to the termination of a gamma ray detection event. The stepwise response selectively seals and unseals the pipe by expanding fluid within the packer unit or other suitable means of expanding the packer into sealing engagement with the pipeline. Once the pipeline has been sealed, fluid pressure behind the packer may be increased and fluid flow in the pipeline monitored to determine whether or not there is a leak. Once the test has been completed, the internally located gamma ray detector is subjected to a further gamma ray detection event which will, upon its termination, bring about the deflation (or the like) of the packer unit, permitting the assembly to be moved along the pipeline to a successive selected location, at which location the test may be repeated. This series of operations is repeated until the entire pipeline has been examined or the location of a leak determined, or as the case may be.

The internally located gamma ray detector within the control unit provides an electrical output signal representative of the gamma radiation detected by the detector. A signal processor receiving and responsive to this electrical output signal provides an energizing signal for the actuation of the packer unit, when the output signal from the gamma ray detector (and consequently the gamma radiation detected thereby) exceeds a preset threshold level. The signal processor conveniently includes a stepping switch which provides the energizing signal cyclically as the stepping switch is sequentially actuated. The signal processor advantageously may include a time delay circuit and a trigger circuit connected to the gamma ray detector via the time delay circuit, which trigger circuit is connected to and actuates the stepping switch when the output signal from the gamma ray detector exceeds a preset threshold voltage for a period of time determined by the time delay circuit. The stepping switch preferably moves to its next position immediately following the completion of a corresponding actuation of the stepping switch by the trigger circuit. Conveniently, the stepping switch may have three positions, namely, "inflate", "deflate" and "off" positions to provide an "inflate" energizing signal to the inflating pump or other suitable means for expanding the packer into sealing engagement with the interior walls of the pipeline, a "deflate" energizing signal to energize the deflate solenoid to permit fluid to be extracted from the packer unit, and the unit thus to deflate and terminate the seal, and an "off" position during which the assembly may be transported within the pipeline from location to location. While inflation of the packer by means of fluid injection therein (either from an internally located fluid source or by pumping fluid from within the pipeline into the packer unit) is specifically contemplated and discussed in the detailed description to follow, it must be understood that other means for expanding the packer are known in the art, such as the depression of a piston against a flexible fluid-containing packer unit forcing the outer walls thereof into sealing engagement with the interior walls of the pipeline. The trigger circuit may be a Schmitt trigger circuit using a unijunction transistor or the like, and the gamma ray detector may be a geiger counter or other suitable gamma ray detector. The specifics of the circuitry selected will be within the discretion of the individual designer.

DETAILED DESCRIPTION WITH REFERENCE TO THE ACCOMPANYING DRAWINGS

Figure 1:
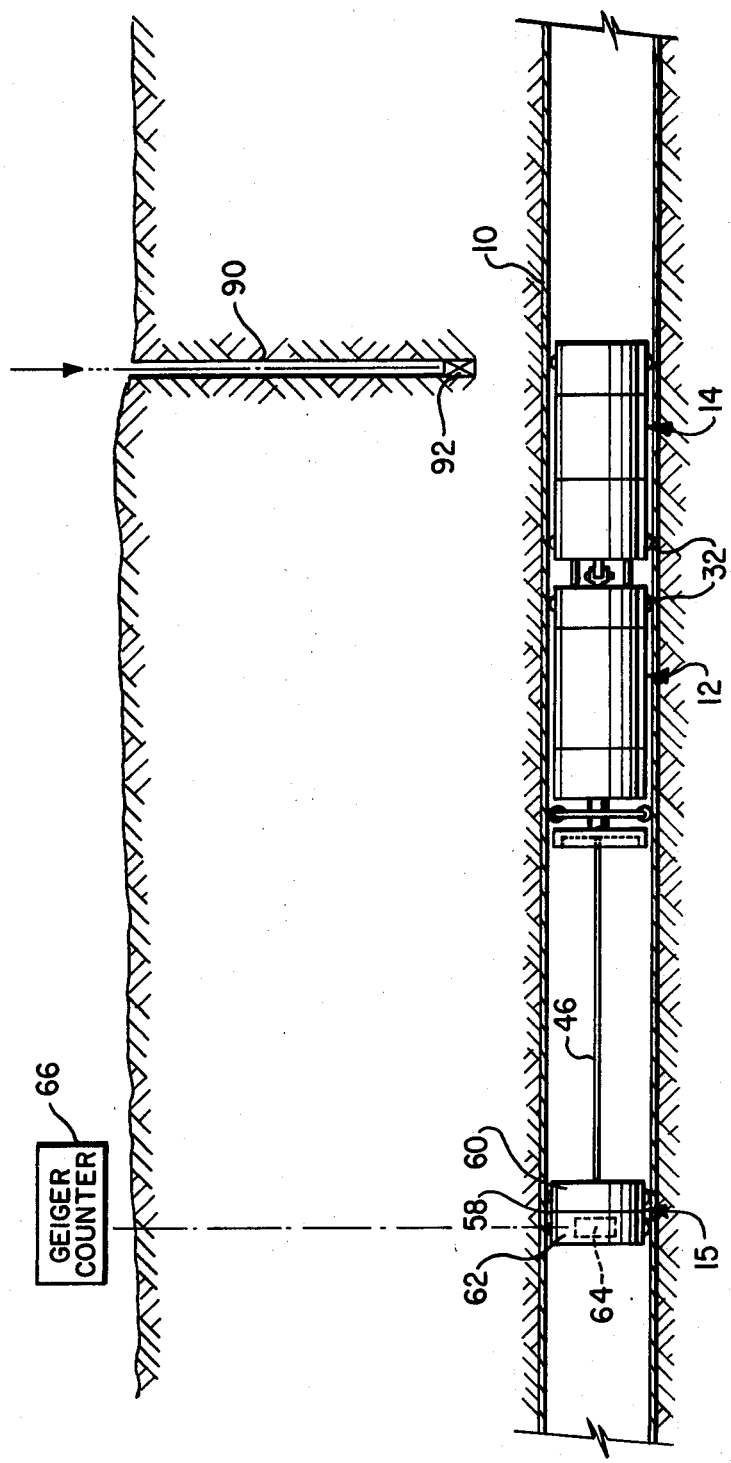
FIG. 1 is a schematic diagram illustrating the manner of practising the leak location detection method according to the present invention.

Referring to FIG. 1, a pipeline 10 of steel or the like material is to be tested for leaks. To this objective, a packer assembly comprising three main units, namely, a packer unit 12, a packer inflating and deflating unit 14, and a trailing radioactive source unit 15 is introduced into the interior of the pipeline 10.

Units 12, 14 and 15 are of overall cylindrical shape for convenient passage through the pipeline. Support wheels 32 are provided as required to maintain a slight clearance between the outer cylindrical walls of units 12, 14 and 15 and the interior walls of the pipeline 10. The radioactive source unit 15 is attached by tow cable 46 to an eye-mounting 48 located at the rear of the unit 12.

Figure 2:
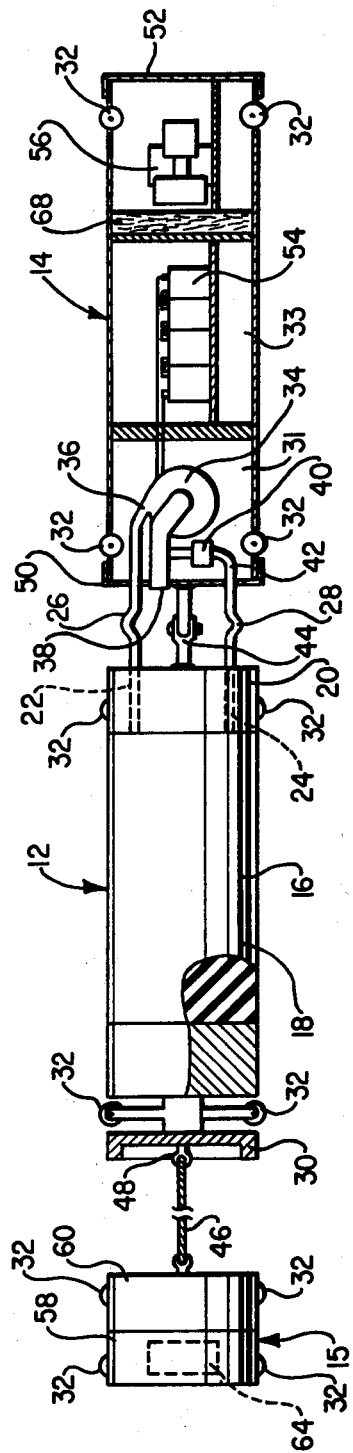
FIG. 2 is a schematic view of a packer unit and control and energization system therefor, suitable for housing a control device according to the present invention, and for implementing the method of the present invention.

The packer unit 12, shown in more detail in FIG. 2, comprises an inflatable packer element 16, a structurally rigid annular rear end closure 18 of steel or the like, and a forward end cap 20 of steel or the like which provides an end closure for the inflatable packer 16 and through which pass an "inflate" conduit 22 and a "deflate" conduit 24 communicating between the interior chamber of packer 16 and coupling hoses 26 and 28 passing to the unit 14. At the rear end of the packer unit 12 is mounted a rear thrust element 30 against which fluid in the pipeline pushes so as to move the assembly from left to right as seen in FIG. 1 and FIG. 2.

The forward unit 14 is shown as divided into three compartments, a control compartment 35 at the forward end of the unit, a central battery storage compartment 33, and a rear "inflate" and "deflate" compartment 31. The unit 14 is coupled via a universal coupling 44 to the packer unit 12.

The forward unit 14 is provided with end closures 50, 52, which provide a fluid-tight seal for the outer cylindrical wall of the forward unit 14.

Within the forward unit 14, a pump 34 is provided which, when energized, provides fluid under pressure via output conduit 36 and connecting hose 26 to the interior of packer 16 via conduit 22. The pump 34 in FIG. 2 is shown as receiving fluid from the interior of the pipeline 10 via intake conduit 38. Alternatively, a separate source of fluid could be provided within the interior of forward unit 14 for pumping into packer 16. The cylindrical walls of packer 16 are made of rubber or some other suitable flexible material, and when inflated these walls bear against and seal the interior wall of the pipeline 10.

Also, within rear compartment 31 of forward unit 14 is a "deflate" valve 40 connected via conduit 42, coupling hose 28 and conduit 24 to the interior of packer 16. When actuated, valve 40 permits the escape of fluid from the interior of packer 16 via intake conduit 38 (which also serves as an exit conduit) to the interior of the pipeline. Alternatively, the unit could be structured so that the fluid is returned to a storage chamber (not shown) within forward unit 14.

In the central compartment 33 of unit 14, storage batteries 54 are contained which supply electricity to the pump 34 and the solenoid for valve 40 as well as to the control unit 56 located in the forward compartment 35 of unit 14.

Figure 3:
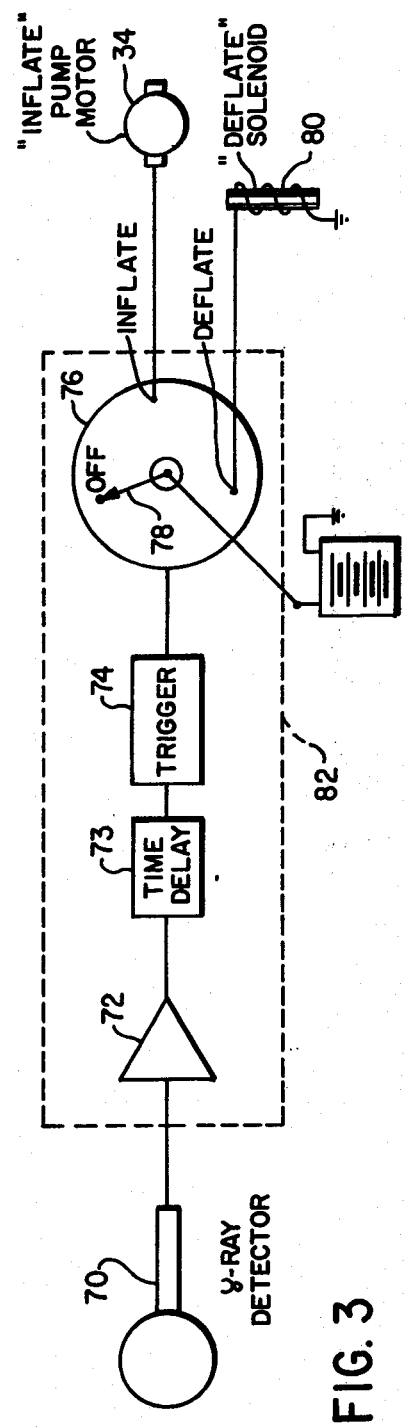
FIG. 3 is a schematic diagram illustrating principal components within an embodiment of a control device according to the present invention, and illustrating signal flow therein.
Figure 4:
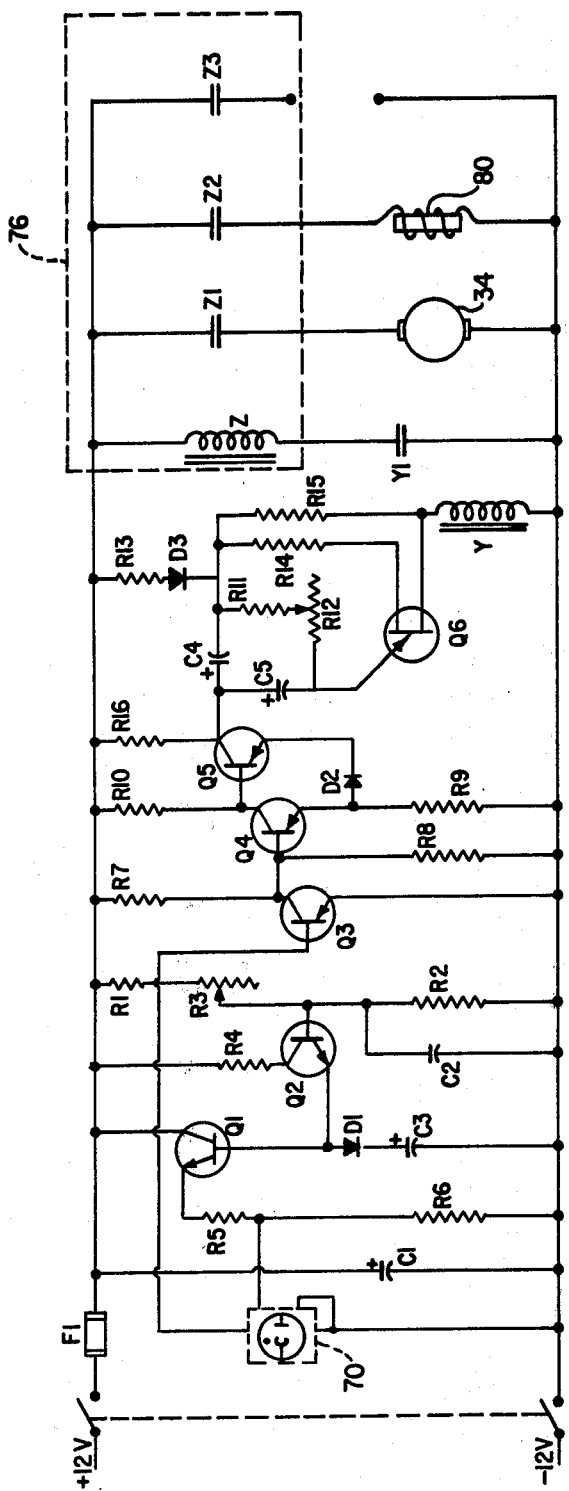
FIG. 4 is a schematic circuit diagram of an embodiment of a control device according to the present invention including a regulated power supply therefor.

Apart from the specific structure and operation of control unit 56, to be described further with reference to FIGS. 3 and 4, the design of forward unit 14 and packer unit 12 is entirely conventional.

Trailing unit 15 comprises a cylindrical housing 58 at the forward end of which is contained radioactive shielding material 60 such as lead or paraffin. Centrally located within the rearward compartment 62 is a radioactive source pellet 64. The strength of the radioactive source 64 should be selected so that gamma rays emitted thereby can penetrate both the steel walls of pipeline 10 and intervening material such as soil to enable a surface-located geiger counter 66 to detect the presence in the pipeline of the radioactive source 64 and thus to monitor the location of the packer unit 12, knowing of course, the length of the tow cable 46. The length of the tow cable 46, the intensity of the radioactive source 64, the thickness and absorption characteristics of the shielding material 60 must all be selected so that the radioactive source 63 does not cause any undesired actuation of the control unit 56 located in forward unit 14. A 1000 millicurie source withh 3 inches of lead shielding is likely to be found satisfactory for applications involving pipe thicknesses of about ½ inch and soil depth of about 6 feet. Additional shielding 68 may, if desired, be located behind the control unit 56 or possibly substituted entirely for the shielding 60 in the trailing unit 15.

The control unit 56 comprises, referring to FIG. 3, a gamma ray detector 70, preferably relatively centrally located with respect to the longitudinal axis of forward unit 14, and capable of receiving and detecting gamma radiation emitted from a source external to the pipeline 10. Gamma ray detector 70 provides an electrical output signal which is passed via amplifier 72 and time delay circuit 73 to a trigger circuit 74. The trigger circuit 74 operates to provide an actuation signal to stepping switch 76 whenever the output signal from amplifier 72 exceeds a preset threshold or bias level established by the circuitry of trigger circuit 74, for a time determined by time delay circuit 73.

Stepping switch 76 operates to move stepping contact 78 through three sequential switch positions, namely, "inflate", "deflate" and "off". The stepping contact 78 is connected to the battery pack 54 to provide energization selectively to the motor 34, and to the deflate solenoid 80 for the valve 40. Stepping switch 76 operates so that the stepping occurs immediately after the completion of a trigger signal provided by trigger circuit 74. Amplifier 72, trigger circuit 74 and stepping switch 76 constitute a signal processor 82 which in effect processes the output signal from the gamma ray detector 70 in a manner suitable to cause the energization of the pump motor 34 and the solenoid 80 selectively as the stepping switch 76 steps through its sequential positions. The "off" position of the stepping switch 76 is provided so that no energization of circuit elements need occur during the transport of the assembly through the pipeline from location to location.

Circuitry suitable to implement the schematic diagram of FIG. 3 is illustrated in further detail in FIG. 4. The battery pack 54 provides a 12 volt power supply via switch SW1 to the gamma ray detector and signal processor, as well as to the pump motor and "deflate" solenoid. The circuitry is protected by a fuse F1 and a smoothing capacitor C1 protects against circuit transients.

Transistors Q1 and Q2, diode D1 and associated resistors and capacitors R1, R2, R3, R4, R5, R6, C2 and C3 constitute a regulated power supply for the gamma ray detector unit 70, whose output is supplied to the base of transistor Q3. Resistor R3 is adjustable to vary the voltage setting at the base of transistor Q2, and thus, to enable the voltage of the electrical power supply to gamma ray detector unit 70 to be adjusted.

Transistors Q3, Q4 and Q5 and associated resistors R7, R8, R9, R10 and R16 and diode D2 constitute an amplifier and Schmitt trigger circuit for the output signal received from the gamma ray detector unit 70. The output of the trigger circuit at the collector of transistor Q5, is applied via a time delay circuit including capacitors C4 and C5, diode D3, resistors R11, R12, R13, R14 and R15, and a unijunction transistor Q6. Current passes through relay winding Y when the unijunction transistor Q6 is switched on. (Transistor Q6, capacitors C4 and C5, resistors R11, R12, R13, R14, R15, diode D3, and relay Y (with contacts Y1) are sold as a single commercial assembly, viz. a Potter & Brumfield solid state timer assembly, Model No. CKB-38-70010). Resistor R13, diode D13 and capacitor C4 happen to be standard circuit components included to enable the circuit to be operated in AC mode. These elements could be eliminated here, as the operation is DC). The voltage level at which the unijunction transistor Q6 fires depends upon the bias voltage established by its associated resistordiode circuitry. The time delay circuit operates to eliminate spurious or random voltages above the threshold voltage required to fire the transistor Q6. By maintaining the time delay long enough (the delay may be adjusted by means of variable resistor R12), it is ensured that only a persistent voltage exceeding the threshold voltage will fire the transistor Q6, thereby to actuate relay Y. (The current flow through relatively high resistance R15 is insufficient to actuate relay Y). A delay time of at least several seconds is recommended, and indeed a delay time of the order of half a minute or more may be desirable in some circumstances.

Relay Y serves as a buffer relay between the relatively low current output of transistor Q6 and the relatively high current flowing through the inflate pump motor 34 and the deflate solenoid 80 when actuated. Accordingly, relay Y operates relay contacts Y1 which, when current flows therethrough, actuate relay winding Z of stepping switch 76. Relay contacts Z1, Z2 and Z3 correspond respectively to the "inflate", "deflate" and "off" switch positions of stepping switch 76 schematically illustrated in FIG. 3. The stepping switch operates in response to the termination of a current flow through the relay winding Z. Thus, if the stepping switch prior to actuation of relay Y has been in the off position Z3, current flow through relay winding Z will place the stepping switch 76 in a "ready" position, and upon termination of current flow, the switch will move to switch position Z1, which will actuate the inflate motor 34 to inflate the packer 16. Similar successive operations of relay Z result in energization of the deflate solenoid 80 and, to complete the cycle, return of the stepping switch to its "off" position when relay contacts Z3 close.

In operation, referring once again to FIG. 1, by the use of the surface geiger counter monitor 66, the progress of the packer assembly through the pipeline can be observed, by reason of the detection by geiger counter 66 of radioactive emissions of the radioactive source 64. The packer assembly is normally moved through the pipeline at relatively low fluid pressures. When the packer assembly has reached a desired location within the pipeline, the flow of fluid into the input end (left-hand end as seen in FIG. 1) is halted and the packer assembly permitted to come to a halt. Since the location of the control unit 56 is known, a bore hole 90 is made in the earth above the pipeline 10 to a point closely proximate to the control unit 56, care being taken not to damage or penetrate the pipeline itself. A radioactive source 92 is inserted into the blind end of the bore hole 90 and detected by the gamma ray detector 70. Means may be provided in association with the radioactive source 92 to shield it during its downward descent and to remove the shielding once it is in the blind end of the bore hole, if desired. In any event, the time delay circuit 73 should operate to avoid false triggering of the stepping switch provided that the source 92 is placed into the bore hole in one reasonably rapid downward movement (reciprocatory movement of the source 92 within the bore hole 90 might generate a sequence of actuations of the stepping switch 76, which would normally be undesirable). Since the stepping switch has been in its "off" position throughout transit of the packer assembly through the pipeline, the insertion of the radioactive source 92 into the blind end of the bore hole 90 will cause the gamma ray detector 70 to produce an output signal which, when amplified, will, after a delay determined by the setting of resistor R12, produce a voltage at the emitter of unijunction transistor Q6 sufficient to trigger the transistor and actuate relays Y and Z. This places stepping switch 76 in a "ready" condition. The radioactive source 92 is then removed from the bore hole 90 and shielded from the control unit 56. This causes a discontinuance of the detection of radioactive emissions by the gamma ray detector 70 with the consequence that the voltage at the output of the time delay circuit 73 is insufficient to maintain the trigger circuit 74 in its conductive state. The consequence is that relay contacts Y1 will open, permitting stepping switch 76 to move into the "inflate" position as relay contacts Z1 close.

Upon closing of relay contacts Z1, the "inflate" pump motor 34 is energized by the battery pack 54 and the packer 16 inflated to make sealing contact with the walls of the pipeline 10. Thereafter, the pressure at the input side (left-hand side in FIG. 1) of the pipeline is increased, and a leak detection test completed, in accordance with conventional practice. (The details of the method of determining whether or not there is a leak, and if so, the extent of the leak, are not within the scope of the present invention). When the test has been completed, pressure in the line is again reduced and the radioactive source 92 once again immersed into the blind end of the bore hole 90, causing the stepping switch 76 to assume once again a "ready" condition. Subsequent withdrawal of the radioactive source 92 from the bore hole 90 and the shielding of the source from the control unit 56 will cause the stepping switch 76 to move to the "deflate" position at which point relay contacts Z2 close to energize the "deflate" solenoid 80, permitting fluid to escape from the packer unit 16 via valve 40 into the interior of the pipe. The wall of packer 16 disengages from the pipeline interior wall, permitting the flow of fluid once again. When the packer 16 is sufficiently deflated, it is desirable to deenergize the "deflate" solenoid 80 so as to avoid undue battery current drain. Accordingly, the radioactive source 92 is once again inserted into the blind end of bore hole 90, let rest for a few moments to permit the voltage at the emitter of unijunction transistor Q6 to rise sufficiently to fire the transistor Q6, and then the source 92 is withdrawn at which point the stepping switch moves into its rest "off" position. The bore hole 90 may then be filled up, gentle fluid flow returned to the pipeline 10 and the packer assembly transported to another location in the pipeline at which a test is desired.

Obviously, the detection characteristics of the gamma ray detectors 70, the strength of the radioactive source 92, and the circuit characteristics of amplifier 72, time delay circuit 73, and trigger circuits 74 must be chosen to be compatible with one another. A radioactive source 92 of a strength of 1 curie, a gamma ray detector 70 in the form of a geiger counter sensitive to radiation in the range 0 to 5 mR/hr. with a Schmitt trigger actuation threshold voltage of about 25 millivolts was found, with the circuit values and components selection detailed below, to give satisfactory results. Relatively long half-life sources such as Colbalt 60 or Cesium 137 are preferred. Although the threshold at which the unijunction transistor Q6 fires has been preset by means of the circuit parameters chosen, obviously, the threshold will vary somewhat depending upon the output voltage level from battery pack 54, which may be expeced to vary over time. This variation will normally not pose any difficulty in carrying out the method according to the present invention because the 1 curie radioactive source 92 placed in the blind end of the bore hole 90 for a sufficiently long period of time, exceeding the time delay threshold established by time delay circuit 73 will in fact, actuate the unijunction transistor Q6, provided that the output voltage of the battery pack 54 is not at an unduly low level. Nickel-cadmium batteries may be chosen for a relatively long reliable life.

Circuit components and values found to be satisfactory in an embodiment of the control unit 56 corresponding to the circuitry of FIG. 4 are as follows:

| RESISTORS | |
|---|---|
| R1,R2 | 220 Ω ½ watt |
| R3 | 5 Ω ½ watt Potentiometer |
| R4 | 2200 Ω ½ watt |
| R5 | 27 Ω 5 watt |
| R6 | 2200 Ω 5 watt |
| R7 | 22 Ω ½ watt |
| R8 | 1 Ω ½ watt |
| R9 | 27 Ω ½ watt |
| R10 | 68 Ω ½ watt |
| R11 | 13 Ω ½ watt |
| R12 | 10 Ω ½ watt Potentiometer |
| R13 | 10 Ω ½ watt |
| R14 | 390 Ω ½ watt |
| R15 | 1000 Ω 1 watt |
| R16 | 330 Ω ½ watt |
| CAPACITORS | | |
| C1 | 500 μf. | 50V DC Electrolytic |
| C2 | 100 μf. | 50V DC Electrolytic |
| C3 | 25 μf. | 50V DC Electrolytic |
| C4 | 27 μf. | 50V DC Electrolytic |
| C5 | 15 μf. | 50V DC Electrolytic |
| TRANSISTORS | | |
| Q1 | ECG123A | NPN SYLVANIA |
| Q2 | ECG152 | NPN SYLVANIA |
| Q3 | ECG160 | PNP SYLVANIA |
| Q4,Q5 | ECG158 | PNP SYLVANIA |
| Q6 | SU112 | UNIJUNCTION |

| DIODES | |
|---|---|
| D1,D2,D3 | —5A6D |

| RELAYS | |
|---|---|
| Y | - POTTER AND BRUMFIELD |
| Z | - GUARDIAN - IR-704-12P-12D 12 VOLT COIL |

MISCELLANEOUS

PUMP MOTOR 34 —PRESTOLITE 12V MODEL-MDY 6104 WITH 12 VOLT AC DELCO AUTOMOTIVE STARTER SOLENOID

DEFLATE SOLENOID 80 —12 VOLT SINGLE ACTIVE-SPRING RETURN SOLENOID

PUMP 34 —DELTA POWER HYDRAULIC CO —MODEL-06

GAMMA RAY DETECTOR 70 —DOSIMETER CORP. —MODEL 3007 (with accompanying probe).

SOURCE 92 —DOSIMETER CORP. - MODEL 3012

Variation and improvements in the foregoing may readily occur to those skilled in the art. For example, it would be convenient to provide a surface vehicle having an auger apparatus suitable for drilling bore holes and carrying a geiger counter detector to detect the emissions from the radioactive source 64. Variations in the structure of the packer assembly can be made without departing from the scope of the invention —generally it is desirable to maintain the control unit and other sensitive assemblies on the low pressure side of the pipeline, and thus, normally the packer unit will train the control unit. However, the two units could be interchanged in position in the pipeline if suitable precautions are taken to protect the control unit. A pressure switch may be provided in the inflate conduit 36 to shut off the pump 34 automatically when the pressure within the packer 16 has reached a predetermined level, and can also re-actuate the pump 34 if the pressure drops below some preset level. Obvious substitutions can be made for the power supply, amplifier, time delay circuit, trigger switch, stepping switch and other units of the present invention. As has alreadyy been mentioned, packers inflated by means of an inflation piston are known and equally could be substituted for the packer assembly described. A beeper circuit could be connected and actuated in the "off" position of the stepping switch so that the sound impulse of the beeper surface circuit would enable a sound probe inserted in the vicinity of the pipeline to determine that the stepping switch is indeed in the "off" position. A stainless steel probe inserted from the surface to detect the pipeline could, in combination with a suitable transducer, readily detect the sound output of such beeper circuit.

What is claimed is:

1. In or for use with a pipeline packer assembly having a packer unit for sealing the pipe when actuated and actuating means responsive to an energizing signal for selectively actuating the packer unit;
   a control device for the actuating means comprising:
   a gamma ray detector providing an electrical output signal representative of the gamma radiation detected by the detector, and
   a signal processor receiving and responsive to the electrical output signal from the gamma ray detector and providing said energizing signal for the actuating means when the gamma radiation exceeds a set threshold level, said signal processor providing said energizing signal when the gamma radiation intensity exceeds a set threshold level for at least a set period of time, and wherein the signal processor includes a stepping switch which provides said energizing signal cyclically as the stepping switch is sequentially actuated.

2. The control device of claim 1, wherein the signal processor includes a time delay circuit and a trigger circuit connected to the gamma ray detector via the time delay circuit, which trigger circuit is connected to and actuates the stepping switch when the output signal from the gamma ray detector exceeds a threshold voltage for a period of time determined by the time delay circuit.

3. The control device of claim 2, wherein the provision of the energizing signal by the stepping switch immediately follows the completion of a corresponding actuation of the stepping switch by the trigger circuit.

4. In or for use with a pipeline packer assembly having an inflatable pipe wall-engaging packer unit, inflating means for supplying fluid under pressure to the inflatable packer unit thereby to force the unit into sealing engagement with the pipe wall in response to an "inflate" energizing signal and deflating means for permitting release of fluid from the packer unit in response to a "deflate" energizing signal;
a control device for the inflating and deflating means comprising:
a stepping switch stepping, in response to the completion of a switching signal, sequentially and cyclically to "inflate", "deflate" and "off" switch positions and providing the "inflate" energizing signal at the "inflate" position and providing the "deflate" energizing signal at the "deflate" position;
a trigger circuit connected to the stepping switch for providing the switching signal thereto;
a gamma ray detector for use in combination with a gamma ray source external to the pipeline, said detector providing an electrical analogue signal having a voltage representative of the intensity of gamma radiation detected by the detector; and
a time delay circuit connected between the gamma ray detector and the trigger circuit;
whereby the trigger circuit provides the switching signal to the stepping switch whenever the gamma ray detector detects gamma radiation exceeding a threshold level for a period of time determined by the time delay circuit.

5. The control device of claim 4, wherein the trigger circuit comprises Schmitt trigger circuit.

6. The control device of claim 5, wherein the gamma ray detector comprises a geiger counter.

* * * * *